United States Patent [19]

House

[11] 4,126,392

[45] Nov. 21, 1978

[54] OPTICAL SYSTEM FOR LASER DOPPLER VELOCIMETER AND THE LIKE

[75] Inventor: Randolph D. House, Manchester, Conn.

[73] Assignee: United Technologies Corporation, Hartford, Conn.

[21] Appl. No.: 734,200

[22] Filed: Oct. 20, 1976

[51] Int. Cl.² .............................................. G01B 9/02
[52] U.S. Cl. ...................................... 356/28.5; 356/28
[58] Field of Search ...................... 356/28, 103, 106 R

[56] References Cited

U.S. PATENT DOCUMENTS

| 3,860,342 | 1/1975 | Orloff et al. ............................ 356/28 |
| 3,966,324 | 6/1976 | Iten ..................................... 356/28 X |

OTHER PUBLICATIONS

Brayton et al., "A New Dual Scatter, Laser, Doppler Shift Velocity Measuring Technique", *Proc. of the 16th International Aerospace Instrumentation Symposium*, May 11-13, 1970.

DeSilva et al., "Observation of Thomson and Co-operative Scattering of Ruby Laser Light by a Plasma", *Nature*, vol. 203, pp. 1321-1322, Sep. 1964.

*Primary Examiner*—John K. Corbin
*Assistant Examiner*—Matthew W. Koren
*Attorney, Agent, or Firm*—Prutzman, Kalb, Chilton & Alix

[57] ABSTRACT

An LDV optical system for projecting a two-color, two-axis interference fringe system and collecting backscatter radiation for two component velocity measurement. A rotor within an optical head of the system having a pair of beam splitters and a two-color filter provides two pairs of diametrically opposed split beams in orthogonal planes and with the split beams equidistant from the axis of the rotor and is angularly adjustable for setting the angular orientation of the fringe system. In a modified embodiment, a rotor with a single beam splitter providing a single pair of diametrically opposed split beams is connected to a motor to be rotated between 90° limit positions for two component velocity measurement using two colors for the measurement of each component. A projection lens of a selected focal length and axially adjustable within a projection barrel provides for projecting the fringe system at a selected point, and a wave front curvature adjustment module provides for adjusting the diameter and divergence of the split beams forming the interference fringe system. An annular collector lens surrounding the barrel provides direct backscatter collection of radiation from the fringe system with the barrel isolating the collection optics from the projection optics for producing a high signal-to-noise ratio. The collected radiation is transmitted to a two-color receiver via a focusing lens, a pair of flat diagonal mirrors and an aperture located at the focal point of the focusing lens and having a diameter selected for establishing the probe volume diameter of both color channels.

21 Claims, 7 Drawing Figures

OPTICAL SYSTEM FOR LASER DOPPLER VELOCIMETER AND THE LIKE

BRIEF SUMMARY OF THE INVENTION

The present invention relates generally to optical systems for laser doppler velocimeters and the like.

It is a primary aim of the present invention to provide a new and improved optical system for a laser doppler velocimeter (LDV) and the like which has a high signal-to-noise ratio and which permits establishing an interference fringe pattern with a selected fringe spacing, orientation and divergence and optimum fringe contrast.

It is another aim of the present invention to provide a new and improved optical head for projecting and focusing a two-axis interference fringe system for two component velocity measurement. In accordance with the present invention, a new and improved optical head is provided for dividing an input laser beam into two pairs of parallel beams of substantially equal intensity in two substantially perpendicular planes and projecting a two-axis interference fringe system, with the two pairs of beams, at a selected distance in front of the optical head.

It is a further aim of the present invention to provide a new and improved optical head for an LDV and the like having a compact assembly of optical components arranged in axially spaced and generally coaxial alignment. In accordance with the present invention, the optical head is adapted to axially receive a laser beam, adjust the wave front curvature of the laser beam, split the laser beam into an annular arrangement of four equiangularly spaced parallel beams and focus the four beams for establishing a two-axis interference fringe system at a selected point.

It is another aim of the present invention to provide in a two-axis LDV optical head, a new and improved two-channel beam differentiation module for establishing a two-channel, two-axis interference fringe system with the optical head.

It is another aim of the present invention to provide a new and improved LDV optical head for projecting a two-axis, two-channel interference fringe system and for directly collecting backscatter radiation from the fringe system for two component velocity measurement.

It is another aim of the present invention to provide a new and improved LDV optical head for projecting a two-channel interference fringe system and for directly collecting backscatter radiation from the fringe system for velocity measurement.

It is a further aim of the present invention to provide a new and improved backscatter optical collector system for a two-channel interference fringe system permitting selectively establishing the probe volume dimensions of the fringe system for two component velocity measurement.

It is another aim of the present invention to provide a new and improved two-channel optical collecting and focusing system for two-channel velocity measurement.

It is a further aim of the present invention to provide a new and improved LDV optical system useful for example in jet engine compressor and turbine fluid flow analysis and which can be adjusted to accommodate a wide range of flow conditions and applications. In accordance with the present invention, the LDV optical system employs an optical projection head which is readily settable, by adjusting some optical components and replacing other optical components to establish an interference fringe pattern with a selected orientation and fringe spacing and at a selected distance in front of the optical projection head and which may be used to measure a fluid velocity at a point for example deep within the compressor or turbine section of a jet engine.

It is another aim of the present invention to provide a new and improved LDV optical projector head which is highly compact, which has a small frontal area and which is rigid and immune to inadvertent misalignment of its optical components due to vibration or shock.

It is another aim of the present invention to provide in an LDV optical projection and collection head, a new and improved backscatter collector system isolated from the laser projection system and providing a high signal-to-noise ratio.

It is another aim of the present invention to provide a new and improved optical projector head for projecting an interference fringe pattern at a selected angular orientation.

Other objects will be in part obvious and in part pointed out more in detail hereinafter.

A better understanding of the invention will be obtained from the following detailed description and the accompanying drawings of illustrative applications of the invention.

DESCRIPTION OF THE PREFERRED EMBODIMENTS

Figure 1:
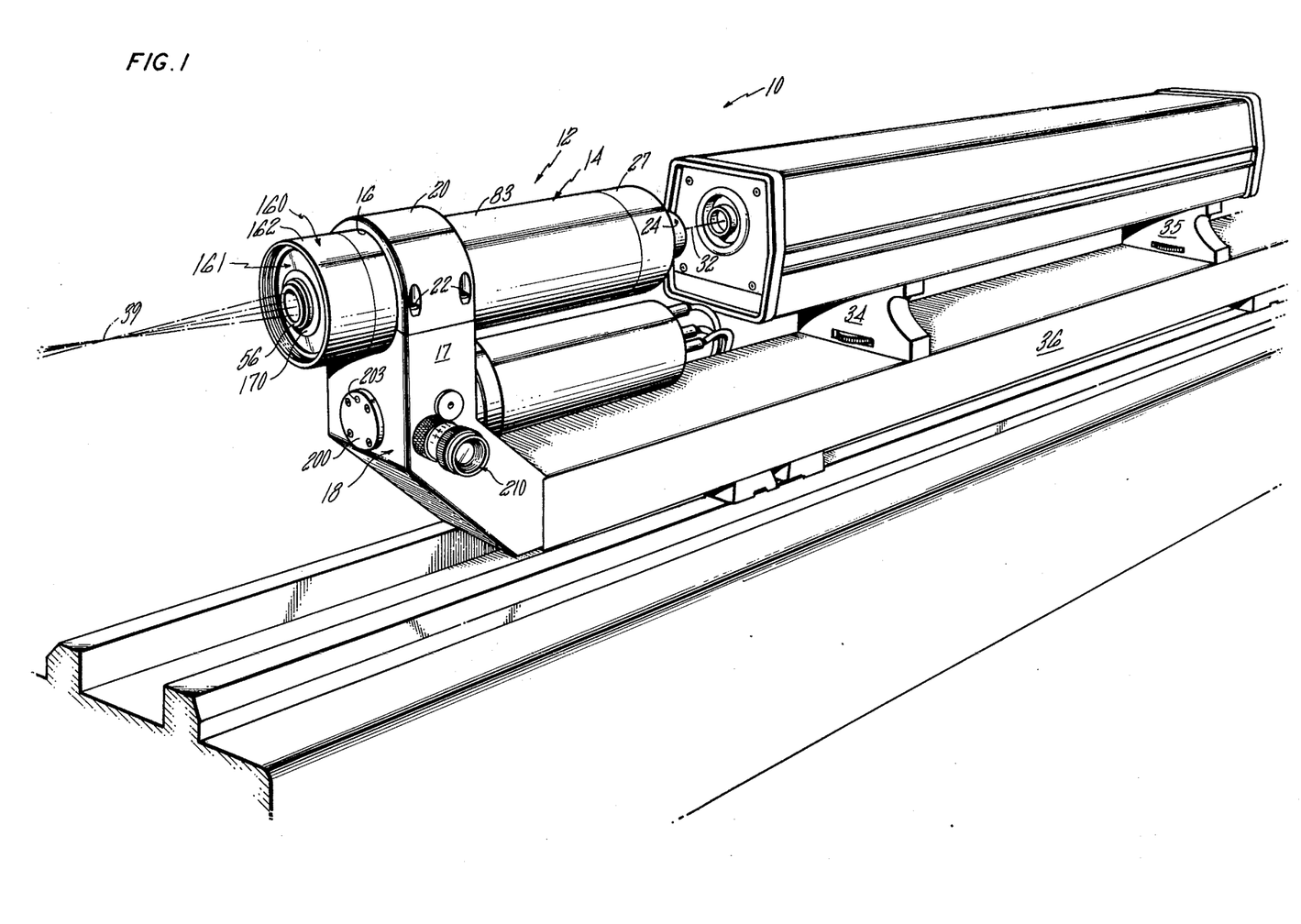
FIG. 1 is a perspective view showing an LDV incorporating an embodiment of an optical system of the present invention.

Referring now to the drawings in detail, a laser doppler velocimeter (LDV) 10 incorporating an embodiment of an optical system of the present invention comprises an elongated optical head 12 with a generally cylindrical multipart housing 14. The optical head 12 is mounted within a cylindrical opening 16 of an upstanding support or stanchion 17 of a generally L-shaped frame 18. An upper cap 20 of the stanchion 17 is adapted to be loosened by fasteners 22 to permit the optical head 12 to be angularly and axially adjusted within the opening 16 for a purpose hereinafter described. The fasteners 22 when tightened provide for rigidly securing the optical head 12 in its adjusted position to the frame 18.

Figure 2:
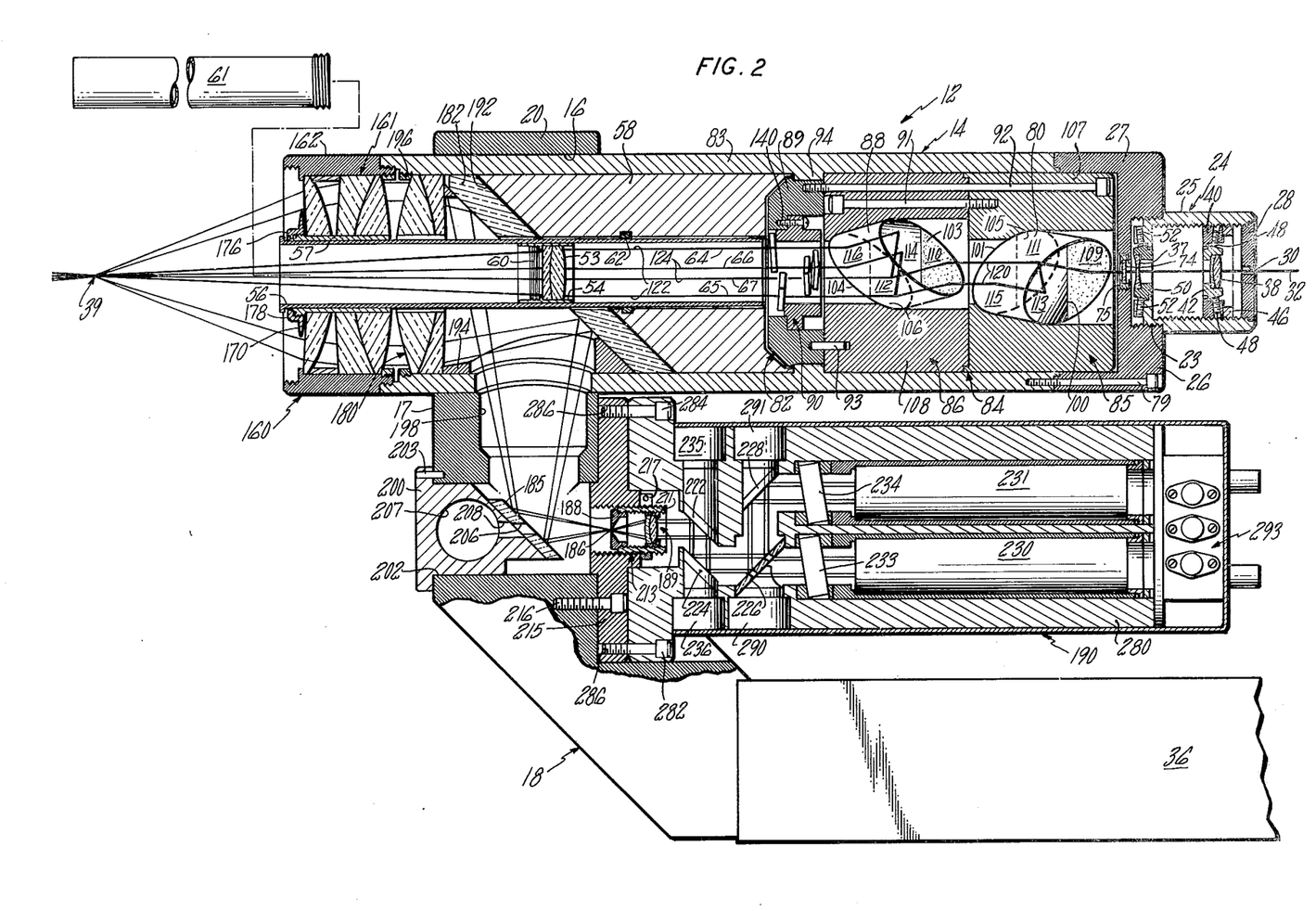
FIG. 2 is an enlarged longitudinal elevation section view, partly broken away and partly in section, of the LDV optical system.

A rear coaxial laser beam adjustment module 24 of the optical head 12 has an internally threaded cylindrical lens housing 25 removably mounted by a threaded connection 23 to a rear wall 26 of a housing cap 27. Also, an externally threaded rear end piece 28 of the module 24 is removably mounted within the rear end of the housing 25. The rear end piece 28 has a central axially extending opening or aperture 30 for axially receiving a laser beam 32 from a suitable laser 33. The laser 33 is mounted to a base 36 of the frame 18 by front and rear supports 34, 35 suitably adjustable to precisely accurately axially align the laser beam with the longitudinal axis of the optical head 12. In the LDV described, a laser 33, such as an Argon-Ion laser, providing 4880 Å and 5145 Å laser beam wave lengths is employed.

A lens system of the adjustment module 24 comprising a front one-element negative lens 37 and a rear two-element positive lens 38 is provided for adjusting the wave front curvature of the incoming laser beam 32 and thereby adjust the fringe volume of and the fringe divergence within an interference fringe system produced by the optical head 12 at its projection focal point 39. The rear positive lens 38 is mounted within an externally threaded annular lens mount 40 via an annular lens retainer 42. An externally threaded locking ring 46 is provided for locking the lens mount 40 and therefore the lens 38 in its adjusted axial position. The lens 38 is accurately centered coaxially with the longitudinal axis of the optical head 12 by means of four equiangularly spaced set screws 48 (only two of which are shown in FIG. 2) to minimize undesirable beam deviation. Similarly, the negative lens 37 is mounted within a retainer 50 and adjusted by four equiangularly spaced set screws 52 (only two of which are shown in FIG. 2) for accurately positioning the lens 37 coaxially with the longitudinal axis of the optical head 12.

The axial spacing and relative focal lengths of the two coaxial lenses 37, 38 are preferably established so that the virtual or apparent source position of the laser beam is at approximately the back focal point of a two-element projection lens 53 and whereby the fringe planes in each projected interference fringe pattern are substantially parallel and fringe plane divergence is minimized or eliminated.

The projection lens 53 is mounted within a sleeve-like retainer 54 and is axially adjustable by axially sliding the lens retainer 54 within a tubular opaque projection barrel 56 and/or by axially adjusting the projection barrel 56 within front and rear barrel supports 57, 58 respectively. The projection lens retainer 54 has a forward internally threaded section 60 for connecting the retainer 54 to a suitable tube 61 (shown in FIG. 2) for manually axially adjusting the projection lens 53 within the projection barrel 56. A suitable O-ring 62 is mounted within an internal annulus of the rear barrel support 58 for frictionally retaining and centering the projection barrel 56. When desired, the projection barrel 56 can be axially extended, preferably so that the rear end of the barrel 56 is not withdrawn forwardly beyond the O-ring 62, for positioning the projection lens 53 forwardly of housing 14. Also, the projection lens 53 can be axially removed from the projection barrel 56 and replaced by another projection lens having a different focal length and the projection barrel 56 can be axially removed and replaced by a longer barrel. Thus, the projection focal length and focal point of the optical head 12 can be selectively established within a wide range in accordance with each LDV application.

The laser beam adjustment module 24 can also be readily removed and replaced by an adjustment module having lenses 37, 38 with focal lengths in accordance with the focal length and axial setting of the projection lens 53 and so that the rear lens 38 can be axially adjusted to set the virtual or apparent source of the laser beam approximately at the back focal point of the projection lens 53 as described.

Also, the number of fringe planes in each fringe pattern or the size of the fringe volume is established by the relative focal lengths of the lenses 37, 38 and the axial adjustment of the rear lens 38. That is so because the two lenses 37, 38 provide, in accordance with their relative focal lengths and relative axial positions, for establishing the diameter and divergence of the laser beam components 64-67 incident upon the projection lens 53 and projected thereby to the projection focal point 39.

A polarization rotator disc 74 suitably cut from a quartz crystal is mounted coaxially with the lenses 37, 38 via an externally threaded crystal retainer 75 secured within an internally threaded axial opening in the rear end wall 26 of the cap 27. The quartz disc 74 is selected to provide a P-pole polarization of the laser beam relative to a rear beam splitter plate 80 of a two-axis, two-channel laser beam rotor 82 to satisfy splitter plate coating design requirements for minimizing reflection losses in connection with the transmission of the laser beam through the rear beam splitter plate 80 and a front beam splitter plate 88, and for ensuring that the resulting split beams have substantially the same intensity. The quartz disc 74 is of the type in which the polarization rotation is a function of the disc thickness. Accordingly, the quartz disc 74 and its retainer 75 are adapted to be readily removed and replaced so that a quartz disc having a thickness corresponding to the angular setting of the rotor 82 can be employed. For that purpose, the housing cap 27 is mounted by suitable fasteners 79 to a center section 83 of the optical head housing 14 to be readily removed for setting the angular position of the rotor 82 and replacing the quartz disc 74.

The two-axis, two-channel laser beam rotor 82 comprises a splitter module 84 with a rear splitter subassembly 85 having the rear beam splitter plate 80 and a front splitter subassembly 86 having a front beam splitter plate 88, and a forward two-channel filter module 90. The three axially spaced coaxial optical components 85, 86, 90 of the rotor 82 are connected by fasteners 91 extending between the splitter subassemblies 85, 86, fasteners 92 extending through the splitter subassemblies 85, 86 and into a filter module retainer 89, and an axially extending locating pin 93 between the filter module retainer 89 and splitter subassembly 86. The splitter module 84 and filter module 90 are mounted for rotation as a unit about the longitudinal axis of the optical head 12 and are locked at any desired angular setting by clamping the module 84 and retainer 89 with the fasteners 92 against an intermediate internal annular flange 94 of the housing section 83. Thus, the rotor 82 can be angularly set for setting the angular orientation of the two-axis fringe system produced at the projection lens focal point 39 by loosening the fasteners 92, rotating the rotor assembly 82 to the desired angular setting and retightening the fasteners 92. As the housing cap 27 must be removed to provide access to the fasteners 92, a quartz crystal disc 74 having the appropriate thickness can be installed when the rotor 82 is reset to rotate the laser beam polarization in accordance with the new angular setting of the rotor 82.

Figure 6:
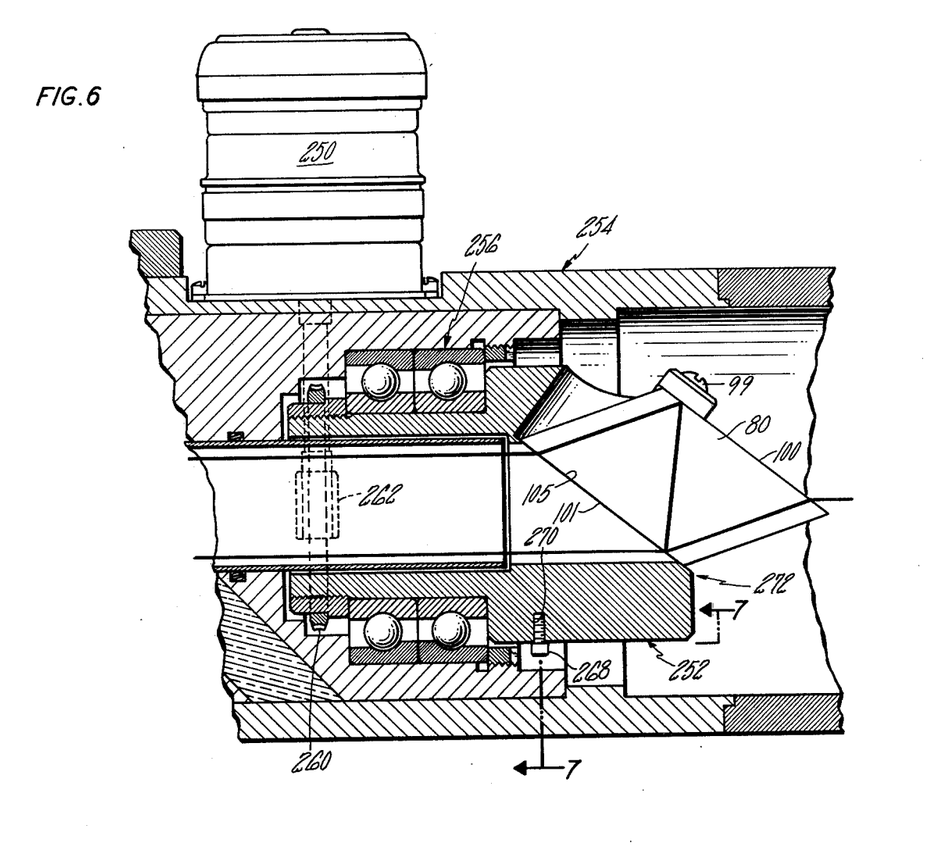
FIG. 6 is a partial, enlarged longitudinal elevation section view, partly broken away and partly in section, of a modified LDV optical system of the present invention.
Figure 7:
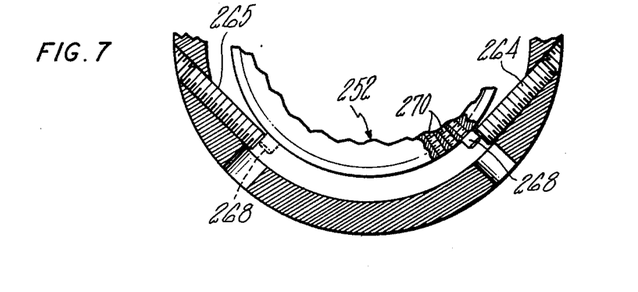
FIG. 7 is a partial transverse section view, partly broken away and partly in section, taken substantially along line 7—7 of FIG. 6.

In the embodiment shown in FIG. 6, a one-component, two-channel rotor 252 with two-axis capability is shown connected to be rotated by a suitable bidirectional electric motor 250. In that embodiment, a single splitter, "two-axis" rotor 252 is rotatably mounted within the optical head housing 254 by a preloaded double-row ball bearing 256, and the rotor 252 is connected to the motor 250 by a worm drive comprising a worm wheel 260 and worm 262. A suitable gear ratio is provided so that the rotor 252 can be accurately angularly set with the motor 250 as desired. A pair of generally circumferentially extending adjustable stop screws 264, 265 are mounted in the housing 254 and a socket head cap screw stop 268 is mounted within a threaded radial opening 270 in the rotor 252 for engagement with the stop screws to limit the angular rotation of the rotor 252 to 90°. The stop 268 is adapted to be selectively mounted in any one of a plurality of 5° equiangularly spaced threaded radial openings 270 in the rotor 252, and the screws 264, 265 are adjustable for adjusting the 90° limits through a 5° arc for selectively orienting the 90° angular limits of the rotor for each application. Also, the stop 268 may be removed to provide for angularly setting the rotor 252 without limits.

Also, with the embodiment of FIG. 6, a fixed polarization rotator 74 may be used to provide a P-pole polarization relative to the beam splitter plate 80 at the 45° or midway position of the rotor 252 between its 90° limit stops 264, 265, and whereby the laser beam polarization relative to the beam splitter plate is the same at both limit positions of the rotor 252. In addition, in the embodiments of FIG. 2 and FIG. 6, an alternate type of polarization rotator, e.g., a half-wave quartz retardation plate (not shown), could be employed which is operable for rotating the laser beam polarization by rotation of the rotator one-half the angle of polarization rotation desired. In that event, the polarization rotator could be suitably geared to the two-axis rotor 82 or 252, as the case may be, to rotate one-half the angle of rotation of the rotor 82 or 252 and so that the polarization rotator maintains the desired P-pole polarization relative to the splitter plate 80.

Figure 5:
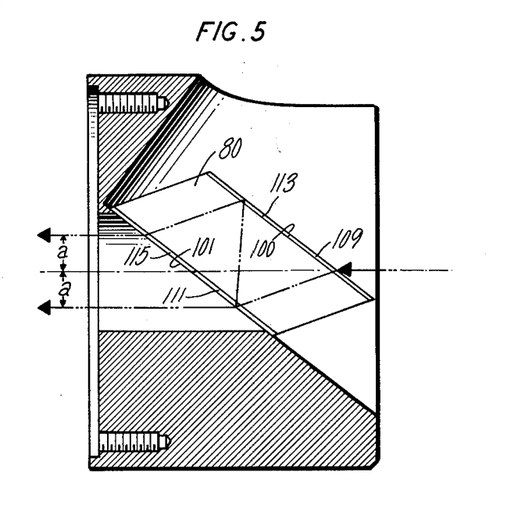
FIG. 5 is an enlarged section view, partly broken away and partly in section, of a beam splitter module subassembly of the LDV optical system.

Referring to FIGS. 2 and 5, the splitter plates or prisms 80, 88 are made for example of suitable optical glass or fused silica and have opposed faces 100, 101 and 103, 104 respectively which are parallel. Also, the splitter plates 80, 88 are preferably formed as oblique circular cylinders as shown to minimize the splitter plate size required and thereby make the optical head 12 more compact. The splitter plates 80, 88 are held by suitable fastener secured retainers 99 (FIG. 6) against inclined flat support faces 105, 106 of their generally annular support housings 107, 108. The inclination of each support face 105, 106 relative to a plane normal to the laser beam axis is established at a predetermined angle $\phi$ in accordance with the formula:

$$\phi = \sin^{-1} \sqrt{\frac{4 - n^2}{3}}$$

where $n$ is the mean index of refraction of the corresponding splitter plate 80, 88 for the wave lengths of the laser beam components 64–67 used to establish the interference fringe pattern. Referring to FIG. 5, when the angle of inclination $\phi$ of the splitter plate is established in accordance with the foregoing formula, it can be shown that an axial input beam to the splitter plate will be split into two parallel output beams having substantially the same lateral displacement $a$ in opposite lateral directions from the axis of the input beam. In the described embodiment, two substantially orthogonal fringe patterns are established with 4880 Å and 5145 Å wave length beams, the selected beam wave lengths being relatively close so that their indices of refraction are not substantially different. Applying the formula and using indices of refraction of 1.46303 and 1.46156 for the 4880 Å and 5145 Å wave lengths for fused silica, the inclination angle $\phi$ for each beam splitter plate 80, 88 is calculated to be 51° 58.6′.

The two splitter plate subassemblies 85, 86 have a 90° relative angular relationship to each other so that the splitter plates 80, 88 have the same inclination $\phi$ relative to orthogonal planes of the longitudinal axis of the optical head 12. As a result, the first or rear beam splitter plate 80 is operative to split the incoming laser beam into a pair of intermediate parallel beams 120 equally laterally displaced a distance $a$ from the longitudinal axis of the optical head 12. The second or front beam splitter plate 88 is operative to split the two intermediate laser beams 120 into four parallel output beams having the same $a \sqrt{2}$ distance from the optical axis of the rotor 82. Thus, by providing splitter plates 80, 88 of the same index of refraction and thickness, the two axially spaced splitter plates 80, 88 together provide for splitting the incoming laser beam into a substantially square spatial configuration of four parallel beams 64–67 about the optical axis of the rotor 82. The four parallel beams 64–67 therefore provide two pairs 122, 124 of diametrically opposed beams 64, 65 and 66, 67 lying in substantially mutually perpendicular planes and operative to produce mutually perpendicular fringe planes in the interference fringe system at the focal point 39.

The radial distance of the four output beams 64–67 from the optical axis of the rotor 82 depends on the thickness of the splitter plates 80, 88 and whereby the thickness of the two splitter plates 80, 88 can be selected to select the fringe spacing of the fringe system in accordance with each application. For that purpose, a pair of matched splitter subassemblies 85, 86 of the beam splitter module 84 can be readily replaced by a substitute pair of matched splitter subassemblies having the desired splitter plate thickness. Also, because the laser beams 64–67 are equally spaced from the optical axis of the projection lens 53, a pair of matched splitter subassemblies 85, 86 may be selected to provide a maximum beam spacing using the maximum available diameter of the projection lens 53. Further, the interference fringe planes provided by each pair 122, 124 of diametrically opposed beams are parallel to the longitudinal axis of the optical head 12.

The first and second surfaces 100, 101 and 103, 104 of the two splitter plates 80, 88 respectively have suitable dielectric coatings to split each incoming beam into output beams having substantially the same intensity for optimum fringe contrast. Thus, one-half of the first surfaces 100, 103 of the splitter plates 80, 88 are coated with anti-reflective coatings 109, 110 respectively to minimize beam reflection, and one-half of the second surfaces 101, 104 of the splitter plates 80, 88 are coated with partially reflective coatings 111, 112 to split the refracted beam at the second surface into reflected and transmitted beams of substantially equal intensity. The remaining one-half of the first surfaces 100, 103 are coated with fully reflective coatings 113, 114 to substantially fully reflect each reflected split beam, and the remaining one-half of the second surfaces faces 101, 104 are coated with suitable anti-reflective coatings 115, 116 to minimize beam reflection of each reflected split beam at the second surfaces.

The coatings on the first and second surfaces of the first or rear splitter plate 80 are provided for the P-pole polarization of the laser beam 32 relative to the splitter plate 80, whereas the coatings on the first and second surfaces of the second or front splitter plate 88 are provided for the S-pole polarization of the split beams 120 relative to the splitter plate 88. Also, in the FIG. 6 embodiment where a fixed polarization rotator 74 is provided to establish a fixed 45° angularly displaced P-pole polarization relative to the splitter plate at the two 90° spaced limit positions of the two-axis rotor 252, the splitter plate coatings would be provided for obtaining split beams of substantially equal intensity at the 90° spaced limit positions.

Figure 3:
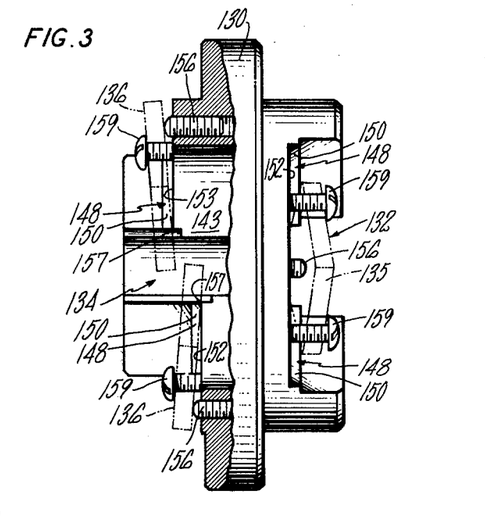
FIG. 3 is an enlarged section view, partly broken away and partly in section, of a two-channel filter module of the LDV optical system.
Figure 4:
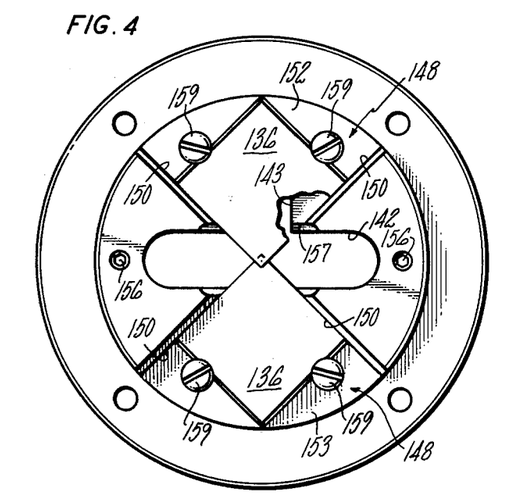
FIG. 4 is an enlarged end view, partly broken away, of the two-channel filter module.

The two-channel control or filter module 90 comprises a central filter mount 130 contoured for supporting two pairs 132, 134 of square narrow band interference filters 135, 136 respectively on opposite axial sides thereof and is secured by fasteners 140 to the outer retainer ring 89. The mount 130 has two mutually perpendicular diametral slots 142, 143 for the two pairs 122, 124 of diametrically opposed laser beams. One pair 132 of filters 135 is mounted within diametrically opposed radially extending and axially offset sector pockets 148 formed on one side of the filter mount 130 to overlie one diametral slot 142, and the other pair 134 of filters 136 is identically mounted within diametrically opposed radially extending and axially offset sector pockets 148 on the opposite side of the filter mount 130 to overlie the other diametral slot 143. The pockets 148 on each axial side of the mount have parallel transverse and axially offset faces 152, 153 and vertical locating sidewalls 150 (having a height which is one-half the thickness of the filter plates 135, 136) so that the filters 135, 136 of each pair are mounted with their inner corners overlapping very slightly at the longitudinal axis of the optical head 12. For that purpose, the locating sidewalls 150 are parallel to but offset slight outwardly from a radial of the filter mount 130. Each filter 135, 136 is mounted to be pivotally adjusted by an axially extending adjustment screw 156 about an inner pivot edge 157 of the respective pocket face 152, 153. In addition, the sidewalls 150 provide an imaginary transverse axis (established by the height of the vertical sidewalls 150) extending parallel to and midway between the opposed parallel faces of the filter for maintaining a constant filter extension inwardly of that imaginary axis. Therefore, each filter plate 135, 136 can be individually tilted for maximum power transmission without substantially changing its slight overlap with the opposed filter plate at the longitudinal axis of the optical head 12. Each filter is then locked in its adjusted pivotal position by threaded retainers 159.

It can therefore be seen that the two interference filters of each pair 132, 134 are positioned to filter a corresponding pair of diametrically opposed laser beams and are effective with any diametral beam spacing within substantially the entire available diameter of the projection lens 53. The filters 135, 136 are selected to transmit 4880 Å and 5145 Å wave length beams respectively for the projection of a two-channel, two-color interference fringe system at the focal point 39 of the projection lens 53. As the retainer ring 89 is keyed by the pin 93 for rotation with the beam splitter module 84, the filter module 90 remains in proper angular alignment with the splitter module 84 as the rotor 82 is angularly adjusted to adjust the angular orientation of the two-axis interference fringe system.

In the embodiment of FIG. 6, the two-axis rotor 252 employs a single beam splitter module 272 which functions to split the incoming laser beam into a pair of laterally spaced beams in the manner of the rear beam splitter subassembly 85. A second beam splitter subassembly is not employed in the embodiment of FIG. 6, and a two-channel filter module 90 suitably angularly settable independently of the rotatable beam splitter module 270 can be employed in the embodiment of FIG. 6 where desired to provide two-channel color filtration at selected 90° positions of the two-axis rotor 252. In an alternate version of the embodiment of FIG. 6, the two-channel filter module 90 is not employed so that an interference fringe system with fringes having two primary colors (and possibly also additional secondary colors depending on the laser 33) is produced at the focal point 39. The two fringe colors are separated in the backscatter collector optics and separately analyzed as hereinafter described.

An annular collector lens assembly 160 is provided at the forward end of the optical head 12 coaxially with and surrounding the projection barrel 56 for backscatter collection of radiation from the interference fringe system at the focal point 39 of the projection lens 53. The collector lens assembly 160 which is shown has a three-element collector lens 161 within an outer annular lens housing 162. The lens housing 162 is mounted by a threaded connection to the central housing section 83, and the backscatter collector lens assembly 160 can thereby be removed and replaced by another collector lens assembly having a focal length and an appropriate lens design with two or three elements permitting the projection lens 53 to be axially positioned substantially as desired and yet focused at the focal point of the backscatter collector lens 161. Also, a cylindrical spacer (not shown) suitably threaded at both axial ends can be inserted between the housing section 83 and the lens housing 162 to selectively axially position the collector lens 161, for example to position the frame 18 sufficiently rearwardly of the focal point 39 to clear test vehicle obstructions. Accordingly, the collector lens 161, cylindrical spacer (not shown) if any, and projection lens 53 are selected and the projection lens 53 is axially positioned so that the collector lens 161 and projection lens 53 have a common focal point selected in accordance with each application. Further, the focal length of the projection lens 53 is selected in combination with the selected beam splitter thickness to establish a desired fringe spacing of the fringe system in accordance with the requirements of each application.

An inner coaxial sleeve of the collector lens assembly 160 forms the forward support 57 for the projection barrel 56 and an annular mask 170 is mounted on the forward end of the sleeve 57 by a threaded connection. The forward end of the sleeve 57 is formed with a plurality of axially extending locking fingers with outer axially tapered edges 176. The mask 170 has an inner annular flange 178 with an internal axially tapered edge engageable with the tapered edges 176 for biasing the locking fingers inwardly for locking the barrel 56 in its selected axial position. For removing the collector lens assembly 160, the projection barrel 56 is removed first after loosening the mask 170 to release the collet type lock.

The mask 170 is provided for controlling the axial length of the probe volume and the collected energy level and for increasing the focus angle of the backscatter collector lens 161 and thereby "focus" the collector lens 161 onto a smaller defined probe volume of the interference fringe volume. The backscatter mask 170 can be removed and replaced by a substitute mask having a different outer diameter as desired.

Also, it can be seen that the projection lens barrel 56 provides a light shield for shielding the relatively low radiation collection optics from any stray radiation from the projection optics. And, as indicated, the barrel 56 permits the projection lens 53 to be axially positioned to accurately attain coincidence of the focal points of the projection and collection optics.

An annular two-element lens 180 is provided in the forward end of the housing section 83 for transmitting the collimated radiation from the collector lens 161 via a pair of flat diagonal mirrors 182, 185, and focusing the radiation on a central aperture 186 of an aperture plate 188. The radiation is then transmitted via a collimating lens 189 to an elongated photomultiplier receiver module 190. The flat diagonal mirror 182 is mounted against a 45° inclined front end face 192 of the rear annular support 58. A spacer wedge 194 is interposed between the two-element focusing lens 180 and the mirror 182, and an externally threaded retainer 196 is mounted within the forward internally threaded end of the housing section 83 to secure the optical parts in position and with the annular support 58 bearing against the internal flange 94 of the housing. The spacer wedge 194 is suitably formed with axial and transverse openings to permit the transmission of the collected backscatter radiation horizontally to the mirror 182 and then vertically downwardly from the mirror 182 via a vertical bore 198 in the stanchion 17 to the flat diagonal mirror 185. The outer surface of the projection lens barrel 56 is suitably coated to minimize reflection from the barrel 56.

The lower mirror 185 is mounted within the stanchion 17 in horizontal alignment with the aperture plate 188 on a generally cylindrical support plug 200 secured within a corresponding bore 202 of the stanchion 17. The cylindrical support plug 200 is accurately angularly positioned within the stanchion bore 202 by suitable aligning pins 203. The mirror 185 has a central aperture 206 coaxial with the aperture 186, and a suitable tubular compound microscope 210 (FIG. 1) with right angle viewing capability, and for example having a 20X magnification, is adapted to be mounted within a corresponding transverse bore in the stanchion 17 with the inner end of the microscope received within a transverse bore 207 in the support 200 for viewing the center of the aperture plate 188 via a bore 208 in the support plug 200 and the mirror aperture 206.

The aperture plate 188 is externally threaded and is mounted in an internally and externally threaded support sleeve 211 to abut the forward end of the sleeve 211. Also, the collimating lens 189 is axially adjustable within the internally threaded sleeve 211 through the provision of an externally threaded lens mount, and the entire aperture plate assembly 213 comprising the aperture plate 188, collimating lens 189 and support sleeve 211 is axially adjustable as a unit within a threaded bore in a circular support plate 215 secured to the stanchion 17 by fasteners 216. A split internally threaded locking ring 217 is mounted on the support sleeve 211 to engage the circular support plate 215 and lock the aperture plate assembly in its set axial position. The split locking ring 217 has a suitable locking screw for locking the locking ring 217 to the sleeve 211 and thereby retain the locking ring in its set axial position when the aperture plate assembly 213 is removed.

Using the microscope 210, the optical head 12 is axially and angularly set within its support opening 16 in the stanchion 17 and the aperture plate assembly 213 is axially adjusted within to accurately focus the two-element lens 180 at the center of the aperture 186. This is preferably done by removing the projection barrel 56 and forward collector lens assembly 160 and placing a flat mirror against the flat forward end of the housing section 83 and transmitting collimated light in the reverse direction through the collimating lens 189 onto the back side of the aperture plate 188 from a suitable auxiliary light source (not shown) mounted on the sleeve 211. The auxiliary light is transmitted through the aperture 186 and via the diagonal mirrors 185, 182 and focusing lens 180 to the mirror (not shown) temporarily placed against the front end of the housing section 83 and then reflected back via the same path to the aperture 186. The optical head 12 is then axially and angularly adjusted using the microscope 210 to center the reflected light spot on the aperture plate 188. The aperture plate assembly 213 is then axially adjusted to minimize the diameter of the light spot on the aperture plate 188 (to essentially equal the diameter of the aperture 186). The center of the collimating lens 189 may be covered with tape so that the auxiliary light is not transmitted directly through the aperture 186 to the microscope 210.

In addition, for each application, the projection optics are adjusted to focus the interference fringe system at the focal point of the backscatter collector lens 161. For that purpose, a knife edge (not shown) is axially adjusted to the focal point of the backscatter collector lens 161 by forming a minimum diameter light spot on the aperture plate 188 from the backscatter radiation. The projection lens 53 is then axially adjusted in the barrel 56 until the projection beam crossover point coincides with the knife edge. This condition is determined by using the knife edge in a modified Foucalt knife edge test in which the partially blocked beams assume equal intensity. With the knife edge fully blocking the projected beams, precise vertical and horizontal adjustments are then made with the front and rear laser supports 34, 35 until the laser beam 32 is centered on the aperture 30 and the backscatter radiation focused onto the aperture plate 188 is centered thereon as viewed by the microscope 210.

The two-element collimating lens 189 is provided for transmitting the backscatter radiation via a pair of diagonal flat aligning mirrors 222, 224, a diagonal filter-mirror 226 and a fully reflective flat mirror 228 to a pair of photomultiplier tube receivers 230, 231. A pair of individually tilted 4880 Å and 5145 Å filters 233, 234 respectively are mounted immediately in front of the PMT receivers 230, 231 to selectively transmit the backscatter radiation from the two mutually perpendicular fringe patterns respectively. The diagonal filter-mirror 226 serves to substantially separate the backscatter radiation into its 4880 Å and 5145 Å components. The receiver module 190 has a body 280 with a forward flange 282 mounted to the support plate 215 with four equiangularly spaced fasteners 284. For that purpose, the support plate 215 has an annular arrangement of forty-eight 7½° spaced threaded apertures 286 for selectively angularly mounting the receiver module 190 in accordance with the angular position of the two-axis, two-channel rotor 82 to provide P-pole polarization of the light relative to the diagonal filter-mirror 226.

The diagonal mirrors 222, 224 are mounted on diametrically opposed radially aligned generally cylindrical plugs 235, 236 received within coaxial bores in the body 280 of the receiver module 190. Suitable locating pins (not shown) are provided for properly angularly locating the plugs 235, 236 and suitable inclined set screws (not shown) are provided in the body 280 for locking each plug 235, 236 in place. The diagonal mirrors 226, 228 are similarly mounted in proper alignment via a pair of diametrically opposed radially aligned mounting plugs 290, 291 received within cylindrical openings in the body 280. Also, suitable locating pins (not shown) and inclined set screws (not shown) are provided for locating and locking the mounting plugs 290, 291.

A suitable amplifier 293 is provided at the rear end of the receiver module 190 for amplifying the output signals from the PMT receivers 230, 231 for transmission to suitable remote circuitry (not shown) provided for analyzing the PMT output signals and making two-component velocity evaluations based thereon.

It can be seen that the diameter of the aperture 186 determines the diameter of the probe volume from which the backscatter radiation is collected for measurement of both components of the two-component velocity measurement. The aperture plate 188 is adapted to be removed and replaced by another aperture plate having an aperture 186 with a diameter selected for each LDV application. Replacement of the aperture plate 188 can be readily accomplished by removing the receiver module 190 from the support plate 215 and withdrawing the aperture plate assembly 213 and then replacing the aperture plate 188. Also, the collimating lens 189 is axially adjusted relative to the aperture plate 188 to establish an optimum beam diameter for the cathode sensitive areas (not shown) of the PMT receivers 230, 231.

As will be apparent to persons skilled in the art, various modifications, adaptations and variations of the foregoing specific disclosure can be made without departing from the teachings of the present invention.

I claim:

1. In an interference fringe system optical unit having optical laser beam splitter means for splitting an incoming laser beam into at least two generally parallel split beams and optical projection and collection means for projecting an interference fringe system with the split beams and for backscatter collection of radiation from the interference fringe system for evaluation; the improvement wherein the optical projection and collection means comprises an inner projection lens and an outer annular collection lens coaxial therewith, and annular opaque separator means between the inner projection lens and outer coaxial collection lens for isolating the backscatter collection of radiation.

2. An optical unit according to claim 1 wherein the inner projection lens is axially settable for axially setting the projected interference fringe system.

3. An optical unit according to claim 2 wherein the annular collection lens is replaceable by a substitute annular collection lens with a different focal length and the inner projection lens is axially settable relative to the outer collection lens for axially setting the interference fringe system relative thereto.

4. An optical unit according to claim 1 wherein the projection lens and collection lens are individually selectively replaceable for selecting the axial position of the projected interference fringe system.

5. An optical unit according to claim 1 wherein the annular separator means is an elongated opaque projection barrel coaxial with the projection lens for receiving the generally parallel split beams.

6. In an interference fringe system optical unit having optical splitter means for splitting an incoming laser beam into an annular arrangement of four generally parallel split beams forming two pairs of diametrically opposed generally parallel split beams, two channel optical means for optically distinguishing the two pairs of diametrically opposed split beams, and optical projection means for projecting a two channel, two axis interference fringe system with the two pairs of generally parallel and optically distinguishable split beams, the improvement wherein the two channel optical means comprises a support having a pair of diametral slots for the transmission of the two pairs of diametrically opposed split beams respectively, a first pair of generally diametrically spaced optical plates overlying one of the diametral slots at one axial end of the support and a second pair of diametrically spaced optical plates overlying the other diametral slot at the other axial end of the support, the first and second pairs of optical plates providing for optically distinguishing the pairs of diametrically opposed split beams respectively to provide first and second different optical channels therewith in the two axis interference fringe system, the support comprising plate mounting means at opposite axial ends of the diametral slots respectively providing for mounting the two pairs of diametrically spaced optical plates in said overlying relationship with the respective diametral slots.

7. An optical unit according to claim 6 wherein the plate mounting means comprises at each axial end of the support a pair of diametrically spaced pockets for mounting the respective pair of optical plates in said overlying relationship with the respective diametral slot, the two pockets being axially offset and contoured for mounting the respective pair of optical plates in axially offset relationship and in slightly overlying relationship at the axis of the pair of diametral slots.

8. An optical unit according to claim 6 wherein the plate mounting means comprises at each axial end of the support a pair of diametrically spaced pockets for mounting the respective pair of optical plates in said overlying relationship with the respective diametral slot, wherein each optical plate has an inner right angle corner at generally the axis of the pair of diametral slots and generally radially outwardly extending mutually perpendicular edges; and wherein each pocket has a pair of mutually perpendicular generally radially outwardly extending locating sidewalls for radially locating the respective plate.

9. An optical unit according to claim 8 wherein the diametrically spaced pockets at each end of the support are relatively axially offset and the locating sidewalls of each pocket are slightly laterally outwardly offset from radials of the axis of the pair of diametral slots for radially locating the plates respectively so that the inner corners thereof slightly overly at said axis.

10. An optical unit according to claim 6 wherein two pairs of optical plates provide for the passage of different laser beam wave lengths respectively and wherein the plate mounting means comprises means for individually pivotally adjusting each plate for maximizing laser beam transmission therethrough.

11. An interference fringe system optical unit comprising, in axially spaced coaxial relationship along an axis of an incoming laser beam, a laser wave front adjustment lens system for adjusting the wave front curvature of the incoming laser beam; a polarization rotator for rotating the polarization of the incoming laser beam; a two-channel, two-axis rotor having beam splitter means for splitting the incoming laser beam into an annular arrangement of four split beams substantially equally radially spaced from its axis of rotation and forming two pairs of diametrically opposed split beams for a two-axis interference fringe system and angularly adjustable for angular adjustment of the interference fringe system, and two-channel optical means for optically distinguishing the two pairs of split beams; and a projection lens for axially forwardly projecting a two-channel, two-axis interference fringe system with the two pairs of optically distinguishable beams.

12. An interference fringe system optical unit according to claim 11 wherein the projection lens is axially adjustable for axially adjusting the position of the interference fringe system.

13. An interference fringe system optical unit according to claim 11 further comprising an annular collection lens coaxial with the projection lens for collection of two-channel backscatter radiation from the interference fringe system for evaluation, an axially extending projection barrel between the projection lens and collection lens for isolating the backscatter radiation, and an annular focusing lens surrounding the projection barrel rearwardly of the annular collection lens for focusing the backscatter radiation.

14. An interference fringe system optical unit according to claim 13 further comprising a two-channel receiver operable for receiving the two-channel backscatter radiation and for generating output signals in accordance with the intensities of the two-channels thereof respectively, and optical control means for directing the backscatter radiation from said focusing lens to the two-channel receiver for operation thereof, the focusing lens having a focal point of the two-channel backscatter radiation and the optical control means comprising aperture means having an aperture at substantially said focal point of the focusing lens for controlling the two-channel backscatter radiation received by the two-channel receiver.

15. An optical unit according to claim 14 wherein the optical unit comprises adjustment means for adjusting the focal point of the focusing lens to the aperture of the aperture means.

16. An optical unit according to claim 13 further comprising a two-channel receiver operable for receiving the two-channel backscatter radiation and for generating output signals in accordance with the intensities of the two-channels thereof respectively, and optical control means for directing the backscatter radiation from the focusing lens to the two-channel receiver for operation thereof, the two-channel receiver being angularly adjustable in accordance with the angular adjustment of the two-channel, two-axis rotor.

17. An optical unit according to claim 11 further comprising an annular collection lens mask for masking the annular collection lens from the relatively low angle backscatter radiation from the interference fringe system and thereby restrict the collection to relatively high angle backscatter radiation from the interference fringe system.

18. An interference fringe system optical unit according to claim 11 wherein the splitter means comprises first and second axially spaced flat splitter plate prisms with parallel faces having the same inclination to orthogonal planes of the axis of the incoming laser beam substantially equal to $$\sin^{-1}\sqrt{\frac{4-n^2}{3}}$$

where $n$ is the mean index of refraction of the splitter plate prisms for the split beam wave lengths of the interference fringe system.

19. An interference fringe system optical unit comprising, a laser wave front adjustment lens system for adjusting the wave front curvature of an incoming laser beam; optical splitter means for splitting the adjusted laser beam into at least two substantially parallel split beams, and optical projection means for axially projecting an interference fringe system with the substantially parallel split beams, the projection lens being adjustable for axially adjusting the interference fringe system, and the laser wave front adjustment lens system being adjustable for adjusting the wave front curvature to adjust the apparent source of the laser beam to approximately the back focal point of the projection lens.

20. An interference fringe system optical unit according to claim 19 wherein the laser wave front adjustment lens system comprises a forward negative lens and a rearward positive lens coaxial therewith for receiving the laser beam and axially adjustable relative to the negative lens for axially adjusting the apparent source position of the laser beam and thereby adjust the fringe plane divergence and fringe volume diameter of the projected fringe system.

21. In an interference fringe system optical unit having optical laser beam splitter means for splitting an incoming laser beam into at least two generally parallel split beams and optical projection and collection means for projecting an interference fringe system with the split beams and for backscatter collection of radiation from the interference fringe system for evaluation; the improvement wherein the optical projection and collection means comprises an elongated opaque projection barrel parallel to and aligned for receiving the substantially parallel split beams, a projection lens mounted within the projection barrel and adjustable along the longitudinal axis of the projection barrel for axially adjusting the interference fringe system, and an outer annular backscatter collection lens surrounding the opague projection barrel coaxial therewith.

* * * * *